US012548812B2

(12) United States Patent
Maxl et al.

(10) Patent No.: US 12,548,812 B2
(45) Date of Patent: Feb. 10, 2026

(54) TEMPERATURE MEASUREMENT ARRANGEMENT FOR A BATTERY SYSTEM, A BATTERY SYSTEM, AN ELECTRIC VEHICLE, AND A TEMPERATURE MEASUREMENT METHOD

(71) Applicant: SAMSUNG SDI CO., LTD., Yongin-si (KR)

(72) Inventors: Florian Maxl, Graz (AT); Michael Erhart, Seiersberg-Pirka (AT)

(73) Assignee: Samsung SDI Co., Ltd., Yongin-si (KR)

( * ) Notice: Subject to any disclaimer, the term of this patent is extended or adjusted under 35 U.S.C. 154(b) by 826 days.

(21) Appl. No.: 17/877,233

(22) Filed: Jul. 29, 2022

(65) Prior Publication Data

US 2023/0155201 A1  May 18, 2023

(30) Foreign Application Priority Data

Nov. 16, 2021 (EP) .................................. 21208482
Jan. 27, 2022 (KR) ........................ 10-2022-0012706

(51) Int. Cl.
*H01M 10/48* (2006.01)
*B60L 50/64* (2019.01)
(Continued)

(52) U.S. Cl.
CPC ........... *H01M 10/486* (2013.01); *B60L 50/64* (2019.02); *B60L 58/24* (2019.02); *G01K 1/026* (2013.01);
(Continued)

(58) Field of Classification Search
CPC ............. H01M 10/486; H01M 10/425; H01M 10/482; H01M 2010/4271;
(Continued)

(56) References Cited

U.S. PATENT DOCUMENTS

2005/0258859 A1  11/2005  So et al.
2010/0172392 A1*  7/2010  Katzenberger ........... G01K 1/14
  374/185
(Continued)

FOREIGN PATENT DOCUMENTS

CN  102099146 A  6/2011
CN  109477379 A  3/2019
(Continued)

OTHER PUBLICATIONS

The decision of KPO to grant a Patent for Application KR.20220012706 (Year: 2025).*
(Continued)

*Primary Examiner* — Alexander Usyatinsky
(74) *Attorney, Agent, or Firm* — Womble Bond Dickinson (US) LLP (57) ABSTRACT

A temperature measurement arrangement for a battery system includes: temperature sensing diodes in a grid and thermally connectable to battery cells of the battery system, a current supply portion, a voltage measurement portion, and a control portion. The grid has first lines and second lines electrically interconnected with the temperature sensing diodes. A forward direction of each temperature sensing diode pointing from the corresponding first line to the corresponding second line. The current supply portion including current supply connections that are, independently of each other, suppliable with electric current. The first lines are connected between the voltage measurement portion and the current supply portion, and the second lines are connected to the control portion. The control portion connects a selected second line to ground, and the temperature measurement arrangement determines a temperature of the corresponding first temperature sensing diodes by measuring voltages via the voltage measurement portion.

14 Claims, 5 Drawing Sheets

(51) Int. Cl.
  *B60L 58/24* (2019.01)
  *G01K 1/02* (2021.01)
  *G01K 7/01* (2006.01)
  *H01M 10/42* (2006.01)

(52) U.S. Cl.
  CPC ............ *G01K 7/01* (2013.01); *H01M 10/425* (2013.01); *H01M 10/482* (2013.01); *H01M 2010/4271* (2013.01); *H01M 2220/20* (2013.01)

(58) Field of Classification Search
  CPC .... H01M 2220/20; B60L 50/64; B60L 58/24; G01K 1/026; G01K 7/01
  See application file for complete search history.

(56) References Cited

U.S. PATENT DOCUMENTS

| | | | |
|---|---|---|---|
| 2011/0075698 | A1 | 3/2011 | Scholich-Tessmann et al. |
| 2013/0308679 | A1* | 11/2013 | Choi .................. H01M 10/425 374/152 |
| 2013/0322487 | A1 | 12/2013 | Watanabe et al. |
| 2019/0203582 | A1 | 7/2019 | Jarvis et al. |
| 2019/0212209 | A1 | 7/2019 | Jarvis et al. |
| 2020/0020992 | A1* | 1/2020 | Hofer .................. H01M 10/482 |
| 2021/0305634 | A1* | 9/2021 | Erhart .................. H05K 1/181 |

FOREIGN PATENT DOCUMENTS

| | | |
|---|---|---|
| DE | 10 2008 022 015 A1 | 11/2009 |
| DE | 102009012500 A1 | 9/2010 |
| DE | 102020203959 A1 | 9/2021 |
| JP | 05-026739 A | 2/1993 |
| JP | H0526739 * | 2/1993 |
| JP | 2014-70951 A | 4/2014 |
| KR | 10-2021-0122686 A | 10/2021 |

OTHER PUBLICATIONS

The decision of EPO to grant a European Patent for Application EP 21208482 (Year: 2023).*
Extended European Search Report issued in corresponding application No. EP 21208482.6, dated May 9, 2022, 5 pages.
Korean Office Action for KR Application No. 10-2022-0012706, dated May 29, 2024, 7 pages.
Chinese Office Action issued in corresponding CN Patent Application No. 202210857567.5, dated Aug. 4, 2025, 9 pages.

* cited by examiner

TEMPERATURE MEASUREMENT ARRANGEMENT FOR A BATTERY SYSTEM, A BATTERY SYSTEM, AN ELECTRIC VEHICLE, AND A TEMPERATURE MEASUREMENT METHOD

CROSS-REFERENCE TO RELATED APPLICATIONS

This application claims priority to and the benefit of European Patent Application No. 21208482.6, filed in the European Patent Office on Nov. 16, 2021, and Korean Patent Application No. 10-2022-0012706, filed in the Korean Intellectual Property Office on Jan. 27, 2022, the entire contents of which are incorporated herein by reference.

BACKGROUND

1. Field

Aspects of embodiments of the present disclosure relate to a temperature measurement arrangement for a battery system, a battery system, an electric vehicle, and a temperature measurement method.

2. Description of the Related Art

Recently, vehicles for transportation of goods and peoples have been developed that use electric power as a source for motion. Such an electric vehicle is an automobile that is propelled by an electric motor, using energy stored in rechargeable batteries. An electric vehicle may be solely powered by batteries or may be a hybrid vehicle powered by, for example, a gasoline generator or a hydrogen fuel power cell. Furthermore, the vehicle may include a combination of electric motor and conventional combustion engine. Generally, an electric-vehicle battery (EVB or traction battery) is a battery used to power the propulsion of battery electric vehicles (BEVs). Electric-vehicle batteries differ from starting, lighting, and ignition batteries because they are designed to provide power for sustained periods of time. A rechargeable (or secondary) battery differs from a primary battery in that it is designed to be repeatedly charged and discharged, while the latter is designed to provide only an irreversible conversion of chemical to electrical energy. Low-capacity rechargeable batteries are used as power supply for small electronic devices, such as cellular phones, notebook computers, and camcorders, while high-capacity rechargeable batteries are used as the power supply for electric and hybrid vehicles and the like.

A battery system includes a battery management system (BMS), which is any electronic system that manages the rechargeable battery, battery module, and battery pack, such as by protecting the batteries from operating outside their safe operating parameters, monitoring their states, calculating secondary data, reporting that data, controlling its environment, authenticating it, and/or balancing it. For example, the BMS may monitor the state of the battery as represented by voltage (such as by a total voltage of the battery pack or battery modules, or voltages of individual cells), temperature (such as an average temperature of the battery pack or battery modules, coolant intake temperature, coolant output temperature, or temperatures of individual cells), coolant flow (such as flow rate, cooling liquid pressure), and current. Additionally, a BMS may calculate values based on the above information, such as minimum and maximum cell voltage, state of charge (SOC) or depth of discharge (DOD) to indicate the charge level of the battery, state of health (SOH; a variously-defined measurement of the remaining capacity of the battery as a % of the original capacity), state of power (SOP; the amount of power available for a defined time interval given the current power usage, temperature, and other conditions), state of safety (SOS), maximum charge current as a charge current limit (CCL), maximum discharge current as a discharge current limit (DCL), and internal impedance of a cell (to determine open circuit voltage).

The BMS may be centralized such that a single controller is connected to the battery cells through a multitude of wires. The BMS may be also distributed, wherein a BMS board is installed at each cell, with just a single communication cable between the battery and a controller. Or the BMS may have a modular construction including a plurality of controllers, each handling a number of cells, with communication between the controllers. Centralized BMSs are most economical but are least expandable and are plagued by a multitude of wires. Distributed BMSs are the most expensive but are the simplest to install and offer the cleanest assembly. Modular BMSs offer a compromise of the features and problems of the other two topologies.

A BMS may protect the battery pack from operating outside its safe operating parameters (or safe operating area). Operation outside the safe operating area may be indicated by an over-current, over-voltage (e.g., during charging), over-temperature, under-temperature, over-pressure, and/or ground fault or leakage current detection. The BMS may prevent operation outside the battery's safe operating area by including an internal switch (such as a relay or solid-state device) that opens if the battery is operating (e.g., is determined to be operating) outside its safe operating area, requesting the devices to which the battery is connected to reduce or even terminate using the battery, and actively controlling the environment, such as through heaters, fans, air conditioning or liquid cooling.

The BMS includes or is connected to a temperature measurement arrangement for measuring the temperature of the battery cells of the battery system, such as a battery pack or a battery module.

A static control of battery power output and charging may not be sufficient to meet the dynamic power demands of various electrical consumers connected to the battery system. Thus, steady exchange of information between the battery system and the controllers of the electrical consumers may be employed. This information includes the battery system's actual temperature, state of charge (SoC), potential electrical performance, charging ability, internal resistance, actual or predicted power demands, and/or surpluses of the consumers. Therefore, battery systems usually include a battery management system (BMS) for obtaining and processing such information on a system level and also include a plurality of battery module managers (BMMs), which are part of the system's battery modules and obtain and process relevant information on a module level. For example, the BMS usually measures the system voltage, the system current, the local temperature at different places inside the system housing, and the insulation resistance between live components and the system housing. Additionally, the BMMs usually measure the individual cell voltages and temperatures of the battery cells in a battery module.

Thus, the BMS/BMM may be provided for managing the battery pack, such as by protecting the battery from operating outside its safe operating area, monitoring its state, calculating secondary data, reporting that data, controlling its environment, authenticating it and/or balancing it. For example, the BMS/BMM may be provided for measuring a temperature of the battery cells of the battery system.

Conventionally, the temperatures of battery cells of a battery system are measured by using negative temperature coefficient (NTC) sensors. Each NTC sensor includes two sensing lines, which are connected to the electronics. This limits the number of temperature sensors in the battery-pack due to high wiring effort and resulting high costs.

SUMMARY

The present disclosure is defined by the appended claims and their equivalents. Any disclosure provided herein that falls outside the scope of the claims is intended for illustrative and comparative purposes.

According to one embodiment of the present disclosure, a temperature measurement arrangement for a battery system includes: a plurality of first temperature sensing diodes arranged in a grid and configured to be thermally connectable to battery cells of the battery system, a current supply portion, a voltage measurement portion, and a control portion. The grid includes a first number of first lines, a second number of second lines, and plurality of connections. Each connection electrically interconnects one of the first lines or one of the second lines with one of the first temperature sensing diodes, and each of the first temperature sensing diodes is oriented so that its forward direction points from one of the first lines to one of the second lines. The current supply portion includes a plurality of current supply connections that are independently of each other suppliable with electric current. Each of the first lines has a first end that is connected to the voltage measurement portion and a second end that is connected to the current supply portion via one of the current supply connections. Each of the second lines has a first end that is connected to the control portion via a control portion connection. The control portion is configured to connect the first end of a selected second line to ground, and the temperature measurement arrangement is configured to determine temperatures of the first temperature sensing diodes, which are connected to the selected second line, by measuring voltages via the voltage measurement portion.

According to another embodiment of the present disclosure, a battery system includes a plurality of battery cells and a temperature measurement arrangement according to an embodiment of the present disclosure, and the plurality of first temperature sensing diodes is thermally connected to the plurality of battery cells.

Another embodiment of the present disclosure is an electric vehicle including the battery system according to an embodiment of the present disclosure.

Another embodiment of the present disclosure is a temperature measurement method for a battery system. The method includes the steps of: providing a battery system according to an embodiment of the present disclosure; connecting the first end of a selected second line to ground; and determining temperatures of the first temperature sensing diodes, which are connected to the selected second line, by measuring voltages via the voltage measurement portion.

Further aspects and features of the present disclosure could be learned from the dependent claims or the following description.

BRIEF DESCRIPTION OF THE DRAWINGS

Aspects and features of the present disclosure will become apparent to those of ordinary skill in the art by describing, in detail, embodiments thereof with reference to the attached drawings in which.

DETAILED DESCRIPTION

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

According to one embodiment of the present disclosure, a temperature measurement arrangement for a battery system is provided. The temperature measurement arrangement includes a plurality of first temperature sensing diodes arranged in a grid (or on a grid) and arranged to be thermally connectable to battery cells of the battery system, a current supply portion, a voltage measurement portion, and a control portion. The arrangement of the first temperature sensing diodes in a grid indicates that the first temperature sensing diodes are arranged in a two-dimensional arrangement. Therein, distances between any two pairs of adjacently arranged first temperature sensing diodes may be equal to each other to provide a homogeneous distribution of first temperature sensing diodes or may be different from each other to heterogeneously distribute first temperature sensing diodes (e.g., to localize first temperature sensing diodes at a thermally sensitive portion of a battery cell). Each of the diodes acts as a single temperature-sensor as the voltage drop across the diode is temperature-dependent and can be measured, such as by an analog-digital-converter (ADC).

The grid has a first number of first lines, a second number of second lines, and plurality of connections. Therein, each connection electrically interconnects one of the first lines or one of the second lines with one of the first temperature sensing diodes. The temperature measurement arrangement has a matrix-topology in which each first line is electrically connected to one of the second lines via one of the first temperature sensing diodes and each of the second lines is electrically connected to one of the first lines via one of the first temperature sensing diodes.

The current supply portion includes a plurality of current supply connections that are independently suppliable with electric current. Thus, different from a multiplex-current supply, one or more current supply connections can supply an electric current at the same time (e.g., concurrently or simultaneously). This enables measurement of a plurality of the first temperature sensing diodes of a selected second line concurrently (or simultaneously) to, for example, measure an average temperature over a plurality of first temperature sensing diodes of the selected second line. Therein, each of the first lines has a second end that is connected to the current supply portion via one of the current supply connections.

Each of the first temperature sensing diodes is oriented so that its forward direction points from one of the first lines to one of the second lines. An electric current can flow from one of the first lines to one of the second lines via one first temperature sensing diode, and a voltage drop occurs due to an electrical resistance of the first temperature sensing diode. The resistance of the first temperature sensing diodes is temperature dependent.

Each of the first lines has a first end that is connected to the voltage measurement portion to measure a voltage at each of the first lines and, thus, to measure the temperature-dependent resistances of the first temperature sensing diodes.

Each of the second lines has a first end that is connected to the control portion via a control portion connection. The control portion connects the first end of a corresponding (or selected) second line to ground. Thereby, the control portion selects one of the second lines to perform a voltage measurement and, thus, a temperature measurement. Thus, the temperature measurement arrangement is configured to determine temperatures of the first temperature sensing diodes, which are connected to the selected second line, by measuring voltages via the voltage measurement portion.

For example, embodiments of the present disclosure use a diode-based temperature measurement in a matrix-topology to improve the coverage of temperature measurements, providing improved safety and a greater possibility to detect thermal events in a battery cell or a battery system. Embodiments of the present disclosure provide a cost-efficient method to implement a greater number of temperature sensors arranged in a matrix-topology while reducing the number of wires. This simplifies the construction and layout of the temperature measurement arrangement and the integration of the temperature measurement arrangement in a battery system, thereby enabling an efficient manufacture of a battery system including the temperature measurement arrangement.

According to one embodiment, the temperature measurement arrangement includes (or further includes) a plurality of second temperature sensing diodes. Each of the second temperature sensing diodes is connected in parallel with and oppositely oriented to one of the first temperature sensing diodes. This arrangement provides twice the resolution compared to an embodiment having only the first temperature sensing diodes even though the same number of first lines and second lines are used. In some embodiments, the second temperature sensing diodes are of the same type as the first temperature sensing diodes to simply construction of the temperature measurement arrangement that is not sensitive to the direction of current flowing through the temperature measurement arrangement. In other embodiments, the second temperature sensing diodes are of a different type than the first temperature sensing diodes to enable an efficient and accurate temperature measurement in different temperature ranges.

According to another embodiment, each of the second lines has a second end that is connected to the current supply portion. This efficiently enables the plurality of second temperature sensing diodes to be supplied by a current flowing from the second lines to the first lines via one of the second temperature sensing diodes.

According to another embodiment, the temperature measurement arrangement is configured to supply one or more of the second lines instead of the first lines with a current via the current supply portion and to exchange the voltage measurement portion with the control portion. This enables that, by the exchange of the voltage measurement portion with the control portion, either the first temperature sensing diodes can be used to measure the voltage (e.g., the temperature), or the second temperature sensing diodes can be used to measure the voltage (e.g., the temperature). The temperature measurement arrangement is configured to switch from a temperature measurement by the first temperature sensing diodes to a temperature measurement by the second temperature sensing diodes. Then, because the voltage measurement portion and the control portion are exchanged, the control portion is configured to connect the first end of a corresponding (or selected) first line to ground. The temperature measurement arrangement that is configured to supply one or more of the second lines instead of the first lines with a current via the current supply portion can be formed by providing a separate current supply portion for the first lines and for the second lines. In other embodiments, one current supply portion is provided, and to perform the switching as described above, the current supply portion can be switched to supply the second lines instead of the first lines with current.

According to another embodiment, the current supply portion has one current supply connection per second line. Thus, the current supply connections can supply an electric current to each of the second lines independently of each other and at the same time. This enables measurement of all of the first temperature sensing diodes of the selected second line or an arbitrary selection and/or combination thereof concurrently (or simultaneously).

According to another embodiment, the number of first temperature sensing diodes equals the first number times the second number. To form the matrix-topology, each of the first lines is connected to each of the second lines via one of the first temperature sensing diodes. In some embodiments, the number of second temperature sensing diodes equals the first number times the second number.

According to another embodiment, the current supply portion includes one current supply per first line. Thus, the current supply connections can supply an electric current to each of the first lines independently of each other and at the same time. This enables a measurement of all temperature measuring diodes of the selected first line concurrently (or simultaneously).

According to another embodiment, the voltage measurement portion includes an analog-to-digital converter. This enables the output of digital values for further processing of the acquired temperature data.

According to another embodiment, the first temperature sensing diodes are arranged on and/or in a flexible flat cable (FFC) or flexible printed circuit (FPC). The diodes may be populated on an FFC or FPC to provide a cost-effective temperature sensor distribution in and/or on the surface of a battery cell and/or a battery system.

According to another embodiment, the grid has two times (e.g., double) the first number times the second number connections. This enables that each of the first lines is electrically connected to each of the second lines via one of the first temperature sensing diodes. Optionally, if the temperature measurement arrangement comprises a plurality of second temperature sensing diodes, the grid comprises four times the first number times the second number connections. This enables that each of the first lines is electrically connected to each of the second lines via one of the first temperature sensing diodes and each of the second lines is electrically connected to each of the first lines via one of the second temperature sensing diodes.

According to one embodiment of the present disclosure, a battery system includes a plurality of battery cells and a temperature measurement arrangement according to an embodiment of the present disclosure. The plurality of first temperature sensing diodes is thermally connected to the plurality of battery cells. The temperature measurement arrangement may include any of the above-described features to provide the associated (and other) aspects and features. The battery system including the above-described temperature measurement arrangement allows reliable and spatially resolved temperature measurements and is easier to manufacture due to reduced wiring complexity. The battery system may be a battery cell, a battery module, or a battery pack.

According to an embodiment, the battery system may further include an integrated circuit. The voltage measurement portion and/or the control portion is provided by the integrated circuit of the battery system. Because the integrated circuit is present anyway and is enabled to supply current for performing temperature measurements and/or to acquire measurement signals, system and manufacturing efficiency is improved.

According to an embodiment, the integrated circuit may include a plurality of general-purpose-input-output (GPIO) portions, and each of the first ends of the first lines may be connected to one of the GPIO portions. This enables an efficient implementation of the above-described embodiment. Each of the GPIO portions can be configured to act as an input or an output. Thus, each of the GPIO portion is enabled to act as or to be connected to the voltage measurement portion or the current supply portion of the temperature measurement arrangement, depending on whether the GPIO portion is configured as input or output.

Yet another embodiment of the present disclosure provides an electric vehicle including the battery system according to an embodiment of the present disclosure. Therein, the temperature measurement arrangement may include (or may be) any of the above-described embodiments.

Yet another embodiment of the present disclosure provides a temperature measurement method for a battery system. The method includes, according to one embodiment, the steps of: a) providing a battery system according to an embodiment of the present disclosure; b) connecting the first end of a selected second line to ground; and c) determining temperatures of the first temperature sensing diodes that are connected to the selected second line by measuring voltages via the voltage measurement portion. This enables an efficient and spatially resolved temperature measurement.

Figure 1:
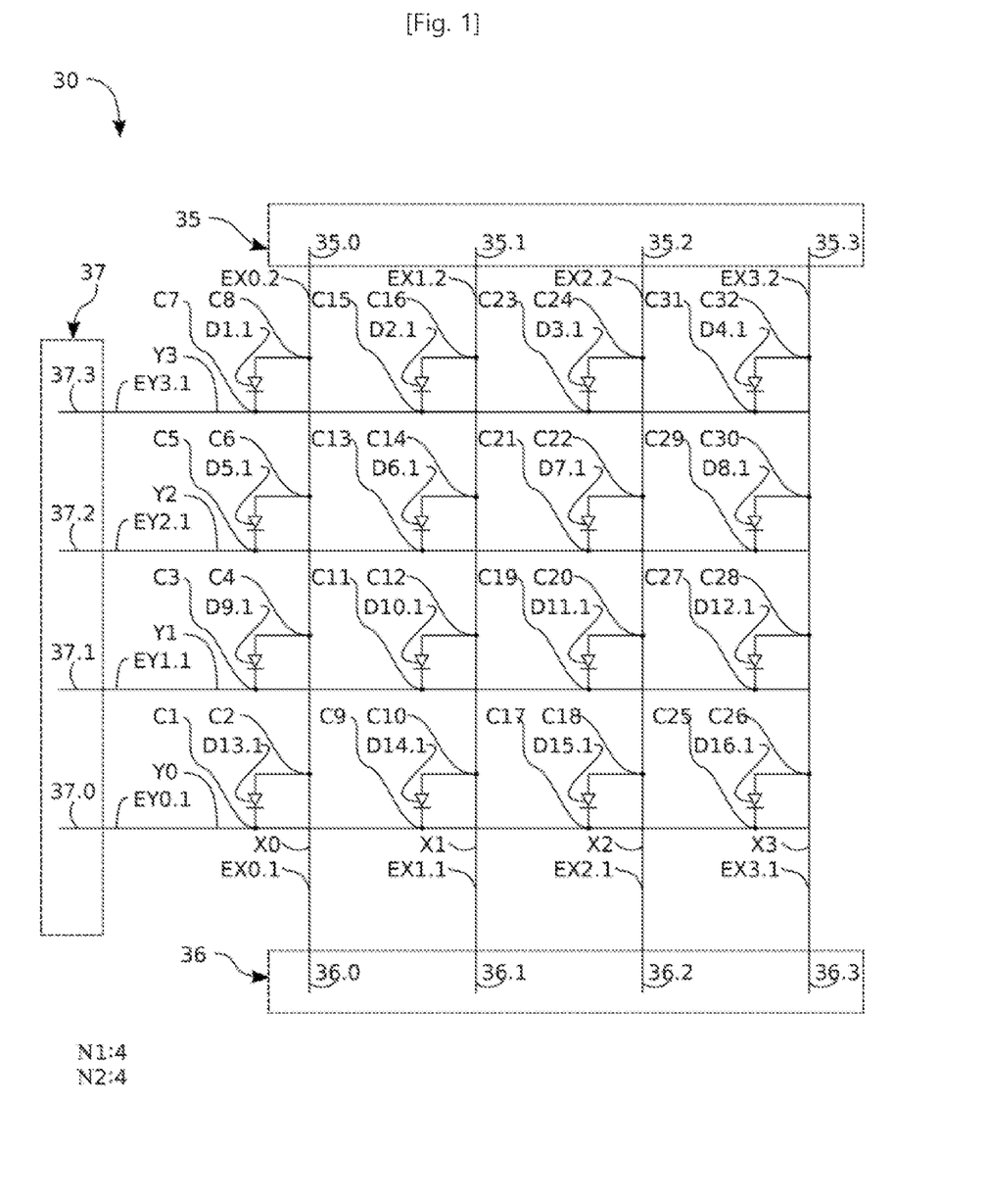
FIG. 1 is a schematic view of a temperature measurement arrangement according to an embodiment.

FIG. 1 is a schematic view of a temperature measurement arrangement 30 according to an embodiment.

The temperature measurement arrangement 30 for a battery system 100 (see, e.g., FIG. 5) includes a plurality of first temperature sensing diodes D1.1, D2.1, . . . , D16.1 arranged in a grid and arranged to be thermally connectable to battery cells 20 of the battery system 100, a current supply portion 35, a voltage measurement portion 36, and a control portion 37.

The current supply portion 35, the voltage measurement portion 36, and the control portion 37 are logical portions and, thus, not necessarily physically present as shown. For example, as explained below with reference to FIG. 5, each of the voltage measurement portion 36 and the control portion 37, and optionally the current supply portion 35, may be provided by a connection to an integrated circuit 101 including a plurality of general purpose input output (GPIO) portions 102.

The grid of the temperature measurement arrangement 30 includes a first number N1 of first lines Xn, where n is a whole number (e.g., four first lines X0, X1, X2, X3 in FIG. 1), a second number N2 of second lines Yn, where n is a whole number (e.g., four second lines Y0, Y1, Y2, Y3 in FIG. 1), and plurality of connections Cn, where n is a whole number (e.g., thirty-two connections C1, C2, ..., C32 in FIG. 1). Each of the connections C1, C2, ..., C32 connects one of the first lines X0, X1, X2, X3 with one of the second lines Y0, Y1, Y2, Y3 via one of the first temperature sensing diodes D1.1, D2.1, ..., D16.1 so that each of the first lines X0, X1, X2, X3 is connected to each of the second lines Y0, Y1, Y2, Y3. Thus, a matrix-topology is formed and the temperature measurement arrangement 30 includes 2×N1× N2 connections (e.g., 2×4×4 equals 32 connections C.1, C.2, ..., C.32 in the embodiment shown in FIG. 1). The number of first temperature sensing diodes D1.1, D2.1, ..., D16.1 equals the first number N1 times the second number N2 (e.g., 4×4 equals to 16 first temperature sensing diodes D1.1, D2.1, ..., D16.1 in the embodiment shown in FIG. 1).

Each of the first temperature sensing diodes D1.1, D2.1, ..., D16.1 is oriented so that its forward direction points from one of the first lines X0, X1, X2, X3 to one of the second lines Y0, Y1, Y2, Y3.

The current supply portion 35 includes a plurality of current supply connections 35.n, where n is a whole number (e.g., current supply connections 35.0, 35.1, 35.2, 35.3 in FIG. 1), which are independently suppliable with electric current.

Each of the first lines X0, X1, X2, X3 has a first end EX0.1, EX1.1, EX2.1, EX3.1 connected to the voltage measurement portion 36. The voltage measurement portion 36 includes a number of voltage measurement connections 36.n, where n is a whole number (e.g., voltage measurement connections 36.0, 36.1, 36.2, 36.3 in FIG. 1), and the number of voltage measurement connections 36.0, 36.1, 36.2, 36.3 equals the first number N1 of first lines X0, X1, X2, X3. Thus, the voltage measurement portion 36, in the embodiments shown in FIG. 1, includes four voltage measurement connections 36.0, 36.1, 36.2, 36.3. The voltage measurement portion 36 includes one voltage measurement connection 36.0, 36.1, 36.2, 36.3 per first line X0, X1, X2, X3. Each of the first ends EX0.1, EX1.1, EX2.1, EX3.1 of the first lines X0, X1, X2, X3 is connected to one of the voltage measurement connections 36.0, 36.1, 36.2, 36.3.

Each of the first lines X0, X1, X2, X3 has a second end EX0.2, EX1.2, EX2.2, EX3.2 connected to the current supply portion 35 via one of the current supply connections 35.0, 35.1, 35.2, 35.3. The current supply portion 35 includes a number of current supply connections 35.n, where n is a whole number (e.g., current supply portions 35.0, 35.1, 35.2, 35.3 in FIG. 1), and the number of current supply connections 35.0, 35.1, 35.2, 35.3 equals the first number N1 of first lines X0, X1, X2, X3. Thus, the current supply portion 35, as illustrated in FIG. 1, includes four current supply connections 35.0, 35.1, 35.2, 35.3. The current supply portion 35 includes one current supply connections 35.0, 35.1, 35.2, 35.3 per first line X0, X1, X2, X3. Thus, each of the second ends EX0.2, EX1.2, EX2.2, EX3.2 of the first lines X0, X1, X2, X3 is connected to one of the current supply connections 35.0, 35.1, 35.2, 35.3.

Each of the second lines Y0, Y1, Y2, Y3 has a first end EY0.1, EY1.1, EY2.1, EY3.1 being connected to the control portion 37 via a control portion connection 37.0, 37.1, 37.2, 37.3. The control portion 37 includes a number of control portion connections 37.0, 37.1, 37.2, 37.3, the number of control portion connections 37.0, 37.1, 37.2, 37.3 being equal the second number N2 of second lines Y0, Y1, Y2, Y3. Thus, in the embodiment illustrated in FIG. 1, the control portion 37 includes four control portion connections 37.0, 37.1, 37.2, 37.3. The control portion 37 includes one control portion connection 37.0, 37.1, 37.2, 37.3 per second line Y0, Y1, Y2, Y3. In other words, each of the first ends EY0.1, EY1.1, EY2.1, EY3.1 of the second lines Y0, Y1, Y2, Y3 is connected to one of the control portion connections 37.0, 37.1, 37.2, 37.3 so that to each of the control portion connections 37.0, 37.1, 37.2, 37.3 is connected to one of the first ends EY0.1, EY1.1, EY2.1, EY3.1 of the second lines Y0, Y1, Y2, Y3. The control portion 37 is configured to connect the first end EY0.1, EY1.1, EY2.1, EY3.1 of a selected second line Y0, Y1, Y2, Y3 to ground.

The temperature measurement arrangement 30 is configured to determine temperatures of the first temperature sensing diodes D1.1, D2.1, ..., D16.1, which are connected to the selected second line Y0, Y1, Y2, Y3, by measuring voltages via the voltage measurement portion 36.

Figure 2:
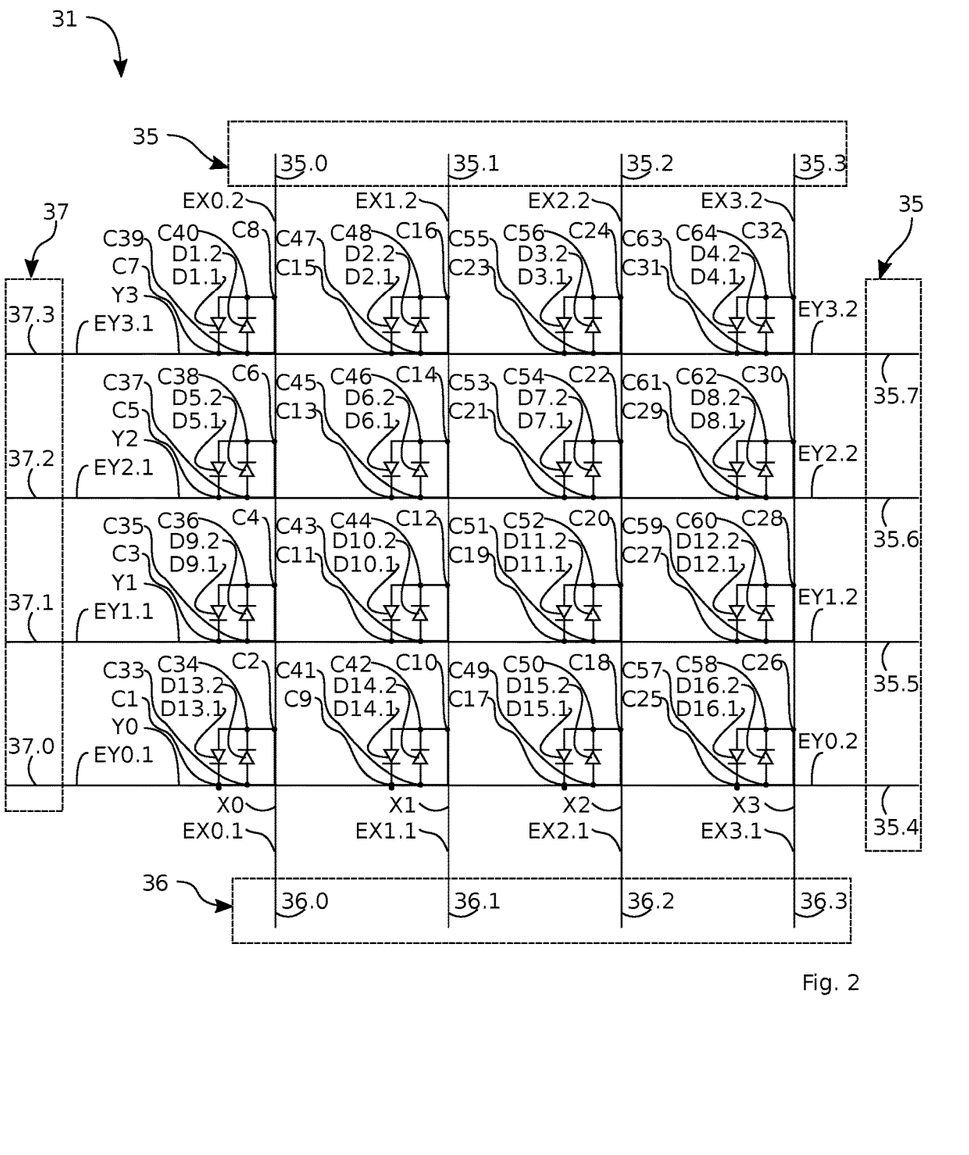
FIG. 2 is a schematic view of a temperature measurement arrangement according to another embodiment.

FIG. 2 is a schematic view of a temperature measurement arrangement 31 according to another embodiment. The temperature measurement arrangement 31 is described with reference to the temperature measurement arrangement 30 as shown in FIG. 1 and explained with reference thereto with the differences between the embodiments of temperature measurement arrangements 30, 31 being detailed below.

The temperature measurement arrangement 31 further includes a plurality of second temperature sensing diodes D1.2, D2.2, ..., D16.2. Each of the second temperature sensing diodes D1.2, D2.2, ..., D16.2 is connected in parallel and oppositely oriented to one of the first temperature sensing diodes D1.1, D2.1, ..., D16.1 (described above with reference to FIG. 1).

Each of the second lines Y0, Y1, Y2, Y3 has second ends EY0.2, EY1.2, EY2.2, EY3.2 that are connected to the current supply portion 35 via a current supply connection 35.4, 35.5, 35.6, 35.7. The current supply portion 35 includes current supply connections 35.0, 35.1, 35.2, 35.3, 35.4, 35.5, 35.6, 35.7, the number of current supply connections 35.0, 35.1, 35.2, 35.3, 35.4, 35.5, 35.6, 35.7 being equal to the first number N1 of first lines X0, X1, X2, X3 plus the second number N2 of second lines Y0, Y1, Y2, Y3. Thus, the current supply portion 35, in the embodiment shown in FIG. 2, includes eight current supply connections 35.0, 35.1, 35.2, 35.3, 35.4, 35.5, 35.6, 35.7. The control portion 37 includes one current supply connection 35.0, 35.1, 35.2, 35.3, 35.4, 35.5, 35.6, 35.7 per first line X0, X1, X2, X3 and per second line Y0, Y1, Y2, Y3. That is, each of the second ends EX0.2, EX1.2, EX2.2, EX3.2 of the first lines X0, X1, X2, X3 and each of the second ends EY0.2, EY1.2, EY2.2, EY3.2 of the second lines Y0, Y1, Y2, Y3 is connection to one of the current supply connections 35.0, 35.1, 35.2, 35.3, 35.4, 35.5, 35.6, 35.7 so that to each of the current supply connections 35.0, 35.1, 35.2, 35.3, 35.4, 35.5, 35.6, 35.7 is connected to one of the second ends EX0.2, EX1.2, EX2.2, EX3.2 of the first lines X0, X1, X2, X3 or one of the second ends EY0.2, EY1.2, EY2.2, EY3.2 of the second lines Y0, Y1, Y2, Y3.

The control portion 37 is configured to connect the first end EY0.1, EY1.1, EY2.1, EY3.1 of a selected second line Y0, Y1, Y2, Y3 to ground. To perform a temperature measurement arrangement 31 by using the second temperature sensing diodes D1.2, D2.2, ..., D16.2, the temperature measurement arrangement 31 is configured to supply the second lines Y0, Y1, Y2, Y3, instead of the first lines X0, X1, X2, X3, with a current via the current supply portion 35 and to exchange the voltage measurement portion 36 with the control portion 37. Then, the control portion 37 is configured to connect to connect the first end EX0.1, EX1.1, EX2.1, EX3.1 of a selected first line X0, X1, X2, X4 to ground.

The alternative measurements by using the first temperature sensing diodes D1.1, D2.1, ..., D16.1 or the second temperature sensing diodes D1.2, D2.2, . . . , D16.2 is explained with reference to FIG. 3 and FIG. 4, respectively.

Figure 3:
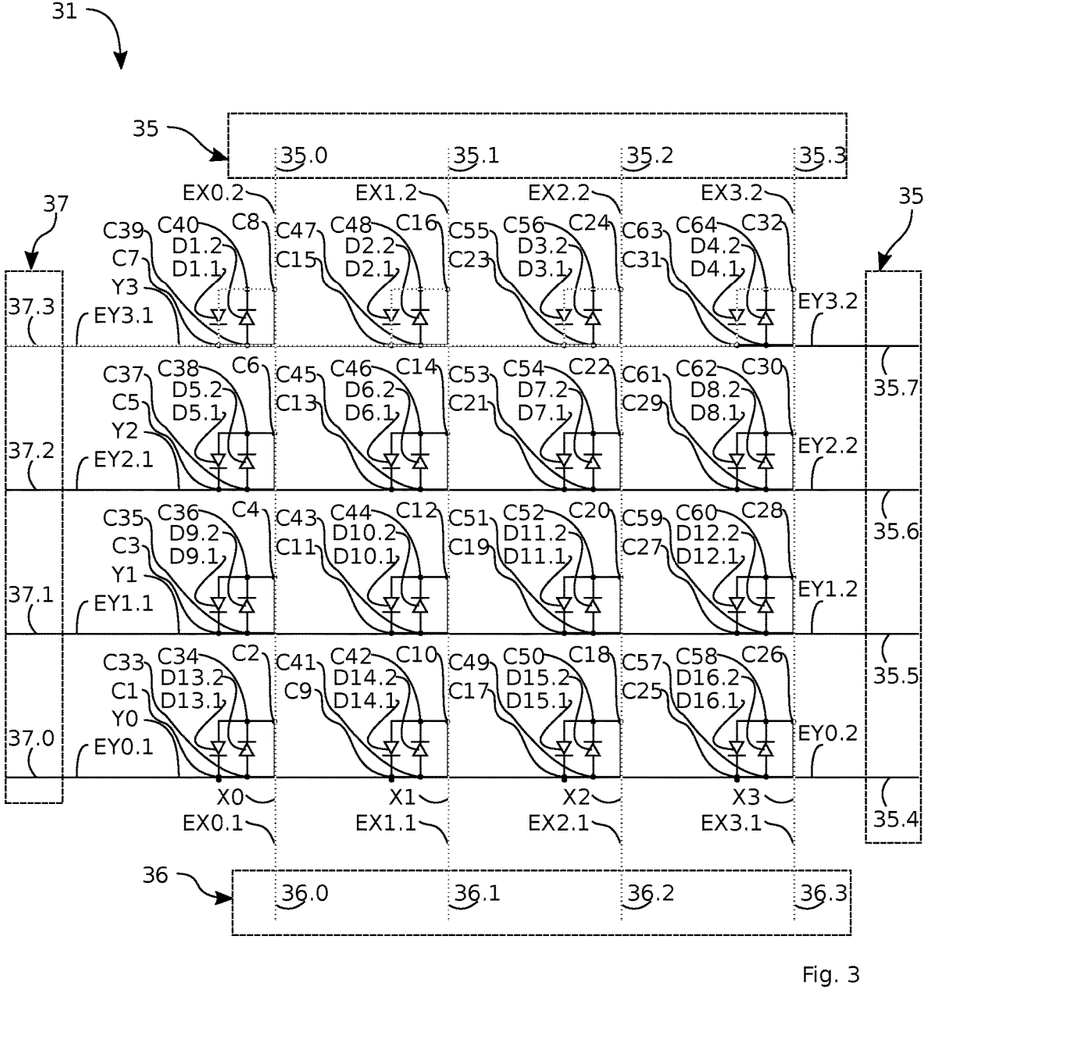
FIG. 3 is a schematic view of a temperature measurement by the temperature measurement arrangement shown in FIG. 2.

FIG. 3 illustrates a schematic view of temperature measurement by the temperature measurement arrangement as shown in FIG. 2.

The current supply portion 35 supplies an electric current at current supply connections 35.0, 35.1, 35.2, 35.3 to the first lines X0, X1, X2, X3 at the second ends EX0.2, EX1.2, EX2.2, EX3.2 of the first lines X0, X1, X2, X3, and at the same time, the current supply portion 35 does not supply an electric current at current supply connections 35.4, 35.5, 35.6, 35.7 to the second lines Y0, Y1, Y2, Y3 at the second ends EY0.2, EY1.2, EY2.2, EY3.2 of the second lines Y0, Y1, Y2, Y3.

To measure the first temperatures sensing diodes D1.1, D2.1, D3.1, D4.1, the second line Y3 is pulled to ground (GND) by the control portion 37 at the control connection 37.3 connected to the first end EY3.1 of the second line Y3. At the same time, the remaining second lines Y0, Y1, Y2 are floating or at a large ohmic resistance. The GPIOs at the first lines X0, X1, X2, X3 are configured as ADC input, for example, each of the GPIO portions is configured as a voltage measurement connection 36.0, 36.1, 36.2, 36.3 of the voltage measurement portion 36.

The path of an electric current flowing through the temperature measurement arrangement 31 for the temperature measurement is indicated by a dotted line.

Figure 4:
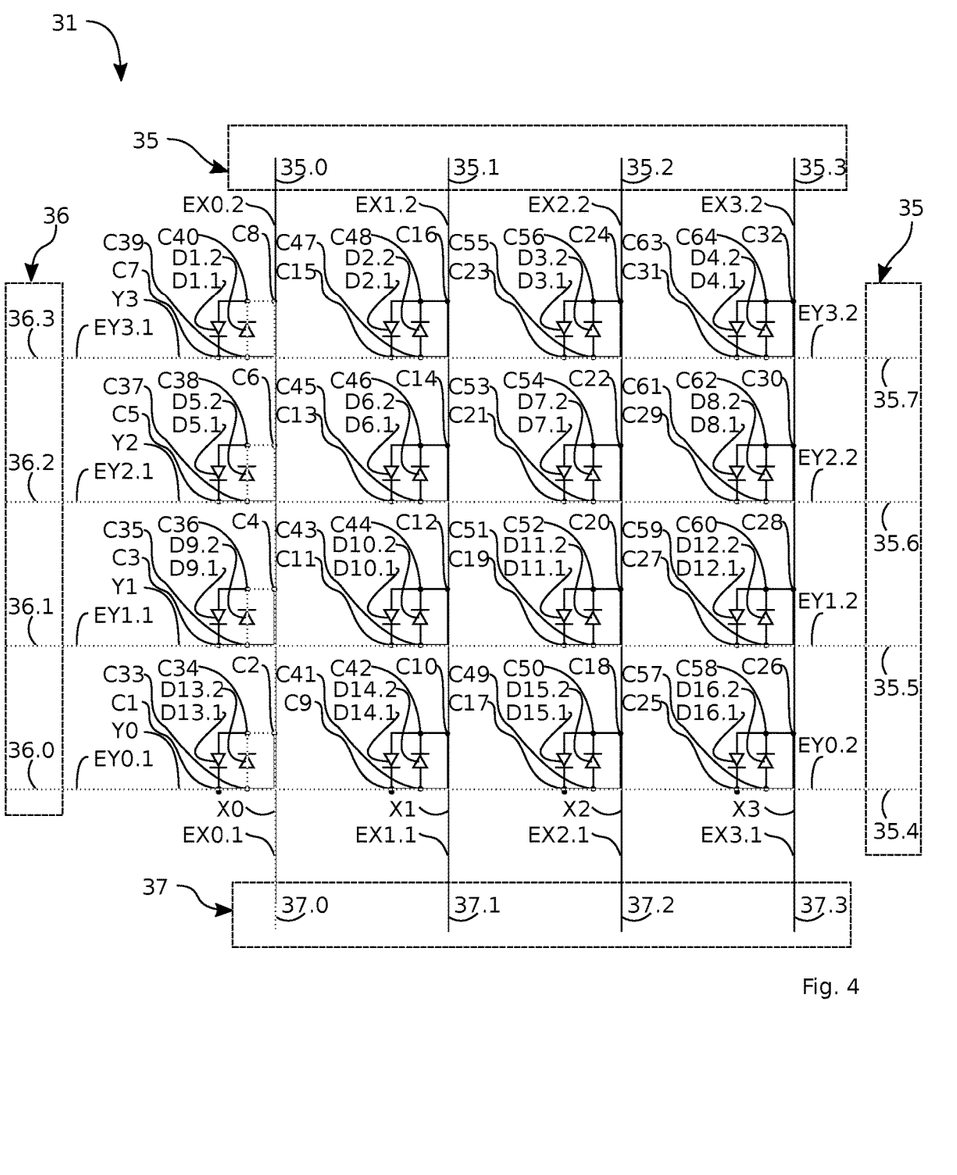
FIG. 4 is a schematic view of another temperature measurement by the temperature measurement arrangement shown in FIG. 2.

FIG. 4 illustrates a schematic view of another temperature measurement by the temperature measurement arrangement as shown in FIG. 2.

In FIG. 4, the voltage measurement portion 36 and the control portion 37 are swapped in position for the purpose of this temperature measurement with respect to the temperature measurement as explained in FIG. 3.

The current supply portion 35 supplies an electric current at current supply connections 35.4, 35.5, 35.6, 35.7 to the second lines Y0, Y1, Y2, Y3 at the second ends EY0.2, EY1.2, EY2.2, EY3.2 of the second lines Y0, Y1, Y2, Y3, and at the same time, the current supply portion 35 does not supply an electric current at current supply connections 35.0, 35.1, 35.2, 35.3 to the first lines X0, X1, X2, X3 at the second ends EX0.2, EX1.2, EX2.2, EX3.2 of the first lines X0, X1, X2, X3.

To measure the second temperature sensing diodes D1.2, D5.2, D9.2, D13.3 the first line X0 is pulled to GND by the control portion 37 at the control connection 37.0 connected to the first end EX0.1 of the first line X0. At the same time, the remaining first lines X1, X2, X3 are floating or at a large ohmic resistance. The GPIO portions at the second lines Y0, Y1, Y2, Y3 are configured as ADC input, for example, each of the GPIO portions is configured as a voltage measurement connection 36.0, 36.1, 36.2, 36.3 of the voltage measurement portion 36.

The path of an electric current flowing through the temperature measurement arrangement 31 for the temperature measurement is indicated by a dotted line.

Figure 5:
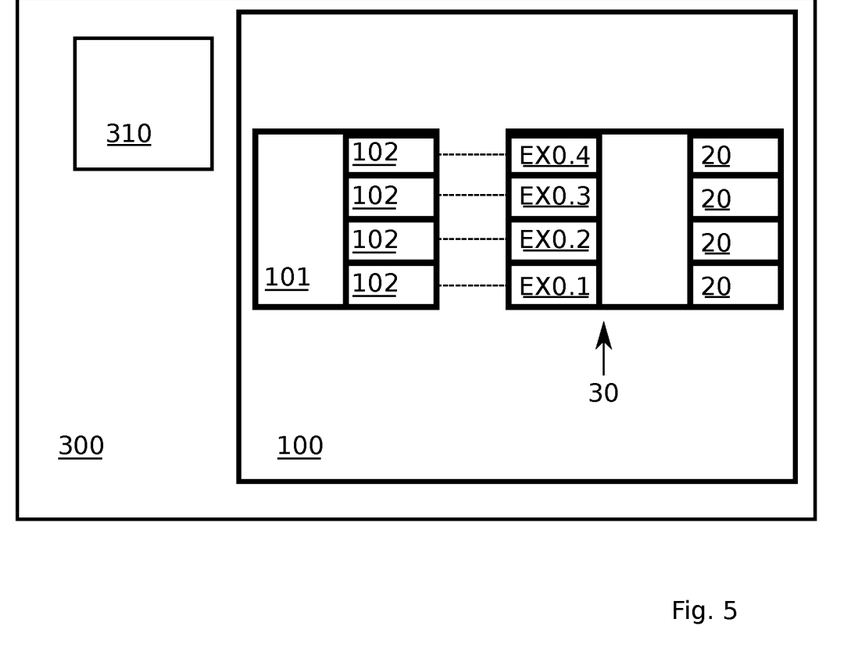
FIG. 5 is a schematic view of an electric vehicle according to an embodiment.

FIG. 5 illustrates a schematic view of an electric vehicle 300 according to an embodiment.

The electric vehicle 300 is propelled by an electric motor 310 using energy stored in rechargeable batteries arranged in a battery system 100. The battery system 100 includes a set of secondary battery cells 20. in FIG. 5, four battery cells 20 are indicated for an illustrative purpose only.

The battery system 100 includes a temperature measurement arrangement 30 as described with reference to FIG. 1. However, the battery system 100 may include a temperature measurement arrangement 31 as described with reference to FIG. 2.

The temperature measurement arrangement 30 is arranged so that the plurality of first temperature sensing diodes D1.1, D2.1, . . . , D16.1 is thermally connected to the plurality of battery cells 20.

The battery system 100 further includes an integrated circuit 101. Therein, the voltage measurement portion 36 and/or the control portion 37 is provided by the integrated circuit 101 of the battery system 100. The integrated circuit 101 includes a plurality of general-purpose-input-output (GPIO) portions 102. Therein, each of the first ends EX0.1, EX1.1, EX2.1, EX3.1 of the first lines X0, X1, X2, X3 is connected to one of the GPIO portions 102 as indicated by one of the lines. Thus, temperature sensing is implemented by using free GPIO-Pins on the Cell-Voltage measurement integrated circuit 101, and the reference voltage is generated by the same integrated circuit 101 to provide a cost-efficient temperature measurement arrangement that reduces or minimizes wiring.

In this schematic example, the first temperature sensing diodes D1.1, D2.1, . . . , D16.1 of one of the first lines X0, X1, X2, X3 are connected thermally to one of the battery cells 20. Thus, for each battery cell 20, the second number N2 of second lines Y0, Y1, Y2, Y3 equal to four first temperature sensing diodes D1.1, D2.1, . . . , D16.1 can be distributed at each of the battery cells 20. This enables an efficient distribution of temperature sensing diodes D1.1, D2.1, . . . , D16.1. In another embodiment, however, fewer, for example, one of the temperature sensing diodes D1.1, D2.1, . . . , D16.1, can be thermally attached to one battery cell 20, or more, for example, all of the temperature sensing diodes D1.1, D2.1, . . . , D16.1 can be thermally attached to one battery cell 20. To facilitate the distribution of the first temperature sensing diodes D1.1, D2.1, . . . , D16.1, first temperature sensing diodes D1.1, D2.1, . . . , D16.1 are arranged on and/or in a flexible flat cable (FFC) or flexible printed circuit (FPC) to be efficiently applicable, for example, mountable, to the battery cells 20.

The voltage measurement portion 36 includes an analog-to-digital converter.

SOME REFERENCE NUMERALS 20 battery cells
30 temperature measurement arrangement
31 temperature measurement arrangement
35 current supply portion
35.0, 35.1, . . . , 35.7 current supply connection
36 voltage measurement portion
36.0, 36.1, 36.2, 36.3 voltage measurement connection
37 control portion
37.0, 37.1, 37.2, 37.3 control portion connection
100 battery system
101 integrated circuit
102 general-purpose-input-output, GPIO, portions
300 electric vehicle
310 electric motor
C.1, C.2, . . . , C.64 connection
D1.1, D2.1, . . . , D16.1 first temperature sensing diode
D1.2, D2.2, . . . , D16.2 second temperature sensing diode
EX0.1, EX1.1, EX2.1, EX3.1 first end of first line
EX0.2, EX1.2, EX2.2, EX3.2 second end of first line
EY0.1, EY1.1, EY2.1, EY3.1 first end of second line
EY0.2, EY1.2, EY2.2, EY3.2 second end of second line
N1 first number N2 second number
X0, X1, X2, X3 first line
Y0, Y1, Y2, Y3 second line

What is claimed is:

1. A temperature measurement arrangement for a battery system comprises:
   a plurality of first temperature sensing diodes arranged in a grid and configured to be thermally connectable to battery cells of the battery system;
   a plurality of second temperature sensing diodes;
   a current supply portion;
   a voltage measurement portion; and
   a control portion,
   wherein the grid comprises a first number of first lines, a second number of second lines, and plurality of connections,
   wherein each of the connections electrically interconnects one of the first lines or one of the second lines with one of the first temperature sensing diodes,
   wherein each of the first temperature sensing diodes is oriented so that its forward direction points from one of the first lines to one of the second lines,
   wherein each of the second temperature sensing diodes is connected in parallel and oppositely oriented to one of the first temperature sensing diodes,
   wherein the current supply portion comprises a plurality of current supply connections that are, independently of each other, suppliable with electric current,
   wherein each of the first lines has a first end that is connected to the voltage measurement portion and a second end that is connected to the current supply portion via one of the current supply connections,
   wherein each of the second lines has a first end that is connected to the control portion via a control portion connection,
   wherein the control portion is configured to connect the first end of a selected second line to ground, and
   wherein the temperature measurement arrangement is configured to determine temperatures of the first temperature sensing diodes that are connected to the selected second line by measuring voltages via the voltage measurement portion.

2. The temperature measurement arrangement as claimed in claim 1, wherein each of the second lines has a second end that is connected to the current supply portion.

3. The temperature measurement arrangement as claimed in claim 2, wherein the temperature measurement arrangement is configured to supply at least one of the second lines instead of the first lines with a current via the current supply portion and to exchange the voltage measurement portion with the control portion.

4. The temperature measurement arrangement as claimed in claim 2, wherein the current supply portion comprise one current supply connection per second line.

5. The temperature measurement arrangement as claimed in claim 1, wherein the number of first temperature sensing diodes (D1) is determined by Equation 1:

$$D1 = N1 \times N2 \qquad \text{Equation 1:}$$

wherein N1 is the first number, and N2 is the second number.

6. The temperature measurement arrangement as claimed in claim 1, wherein the current supply portion comprise one current supply connection per first line.

7. The temperature measurement arrangement as claimed in claim 1, wherein the voltage measurement portion comprises an analog-to-digital converter.

8. The temperature measurement arrangement as claimed in claim 1, wherein the first temperature sensing diodes are arranged on a flexible flat cable or a flexible printed circuit.

9. The temperature measurement arrangement as claimed in claim 1, wherein a number of the connections (C1) is determined by the following Equation 2:

$$C1 = 2 \times (N1 \times N2) \qquad \text{Equation 2:}$$

wherein N1 is the first number, and N2 is the second number.

10. A battery system comprises a plurality of battery cells and the temperature measurement arrangement as claimed in claim 1, wherein the plurality of first temperature sensing diodes is thermally connected to the plurality of battery cells.

11. The battery system as claimed in claim 10, further comprising an integrated circuit,
    wherein the voltage measurement portion and/or the control portion is provided by the integrated circuit.

12. The battery system as claimed in claim 11, wherein the integrated circuit comprises a plurality of general-purpose-input-output portions, and
    wherein each of the first ends of the first lines is connected to one of the general-purpose-input-output portions.

13. An electric vehicle comprising the battery system as claimed in claim 10.

14. A temperature measurement method for a battery system, the method comprising the steps of:
    providing a battery system as claimed in claim 10;
    connecting the first end of a selected second line to ground; and
    determining temperatures of the first temperature sensing diodes, which are connected to the selected second line, by measuring voltages via the voltage measurement portion.

* * * * *